US010001085B2

(12) United States Patent
Isaac et al.

(10) Patent No.: US 10,001,085 B2
(45) Date of Patent: Jun. 19, 2018

(54) SPACE STORABLE, THRUST-VECTORABLE ROCKET MOTOR NOZZLE AND RELATED METHODS

(71) Applicant: Orbital ATK, Inc., Dulles, VA (US)

(72) Inventors: Clinton R. Isaac, North East, MD (US); Adam Naramore, Lancaster, PA (US); Talbot P. Thrasher, Newark, DE (US); Michael D. Lajczok, Wilmington, DE (US); Joseph Bellotte, Christiansburg, VA (US)

(73) Assignee: Orbital ATK, Inc., Plymouth, MN (US)

( * ) Notice: Subject to any disclaimer, the term of this patent is extended or adjusted under 35 U.S.C. 154(b) by 894 days.

(21) Appl. No.: 14/495,063

(22) Filed: Sep. 24, 2014

(65) Prior Publication Data
US 2016/0084200 A1    Mar. 24, 2016

(51) Int. Cl.
*F02K 9/84* (2006.01)
*F02K 9/97* (2006.01)
*F02K 9/08* (2006.01)

(52) U.S. Cl.
CPC ............... *F02K 9/84* (2013.01); *F02K 9/974* (2013.01); *F02K 9/08* (2013.01); *F05D 2230/31* (2013.01); *F05D 2230/40* (2013.01); *F05D 2230/60* (2013.01); *F05D 2240/55* (2013.01); *F05D 2260/231* (2013.01); *F05D 2300/44* (2013.01); *F05D 2300/603* (2013.01)

(58) Field of Classification Search
CPC ............... F02K 9/08; F02K 9/84; F02K 9/974
See application file for complete search history.

(56) References Cited

U.S. PATENT DOCUMENTS

| 3,090,198 A | * | 5/1963 | Zeisloft | F02K 9/84 239/265.25 |
| 3,106,061 A | * | 10/1963 | Eder | F02K 9/84 239/265.15 |
| 3,140,584 A | * | 7/1964 | Ritchey | F02K 9/84 239/265.35 |

(Continued)

FOREIGN PATENT DOCUMENTS

WO    2014125221 A1    8/2014

OTHER PUBLICATIONS

International Search Report for International Application No. PCT/US2015/052028, dated Mar. 11, 2016, 8 pages.

(Continued)

*Primary Examiner* — Lorne Meade
(74) *Attorney, Agent, or Firm* — TraskBritt

(57) ABSTRACT

A thrust-vectoring rocket motor nozzle includes a forward assembly having a forward shell with a flange configured for connection to a motor and a throat portion opposite the flange. A ball joint sleeve may be disposed proximate the throat portion, and an exit cone assembly may include a ball joint socket configured to mate with the ball joint sleeve to allow movement of the exit cone assembly about one or more axes relative to the forward assembly. A thermal barrier may be disposed in a gap between the forward assembly and the exit cone assembly. The forward assembly may include a throat insulator mechanically locked within the forward shell. Related methods include forming thrust-vectorable rocket motor nozzles. Rocket motors may include such nozzles.

15 Claims, 5 Drawing Sheets

(56) References Cited

U.S. PATENT DOCUMENTS

| | | | | |
|---|---|---|---|---|
| 3,142,153 A | * | 7/1964 | Hensley | F02K 9/84 239/265.35 |
| 3,302,885 A | * | 2/1967 | Herbert | F02K 9/84 239/265.19 |
| 3,362,646 A | * | 1/1968 | Connolly | F02K 9/84 239/265.15 |
| 3,811,713 A | * | 5/1974 | Barrett | F16L 27/1004 239/265.19 |
| 3,912,172 A | * | 10/1975 | Bolner | F02K 9/84 239/265.35 |
| 4,350,297 A | * | 9/1982 | Martin | F02K 9/84 239/265.35 |
| 4,458,595 A | * | 7/1984 | Gerrish, Jr. | C08G 18/6681 102/290 |
| 4,666,084 A | | 5/1987 | Mitchell et al. | |
| 6,554,936 B1 | | 4/2003 | Metcalf et al. | |
| 6,948,307 B2 | * | 9/2005 | Berdoyes | F02K 9/84 60/200.1 |
| 7,313,910 B2 | * | 1/2008 | Kim | F42B 10/665 60/228 |
| 7,980,057 B2 | * | 7/2011 | Facciano | B29C 70/28 239/265.11 |
| 8,276,361 B2 | * | 10/2012 | Garbe | F02K 9/84 277/537 |
| 2015/0369175 A1 | | 12/2015 | Berdoyes et al. | |

OTHER PUBLICATIONS

Written Opinion of the International Search Authority for International Application No. PCT/US2015/052028, dated Mar. 11, 2016, 9 pages.

* cited by examiner

SPACE STORABLE, THRUST-VECTORABLE ROCKET MOTOR NOZZLE AND RELATED METHODS

STATEMENT REGARDING FEDERALLY FUNDED RESEARCH

The United States Government may have rights to the present disclosure pursuant to NASA Contract Number NNK12MSO3S, Subcontract Number S12TNG221.

TECHNICAL FIELD

Embodiments of the present disclosure relate to nozzles for rocket motors. More particularly, embodiments of the present disclosure relate to apparatus and methods relate to thrust-vectoring rocket motor nozzles suitable for interpulse storage.

BACKGROUND

Crew transport vehicles and other vehicles that remain in Earth orbit for extended periods require thrust-vectorable rocket motor nozzles capable of interpulse storage (i.e., intermittent ignitions of the motor between periods of non-use). Such multi-pulse operation subjects the motor nozzle to extreme high temperatures during operation of the motor and extreme low temperatures during non-use in space (e.g., more than 100 km above the Earth's surface). Conventional thrust-vectorable rocket motor nozzles may include structural components configured to withstand the loads applied by high gas pressures within the nozzle, and insulating components configured to protect the structural components from melting, charring, or degrading under the flow of hot gas exiting the motor. The structural components may be made from metal alloys (e.g., titanium alloys), and the insulating components may be made from composite materials such as woven carbon or silica fibers in a cured resin (e.g., phenolic) matrix. The insulating components are typically bonded to the structural components with epoxy adhesives.

The extreme temperature cycles to which a rocket motor nozzle is exposed during multi-pulse use can quickly cause failure of the epoxy adhesives. Such adhesives may begin to degrade and potentially debond at temperatures above about 400° F. Furthermore, any difference in thermal expansion rates between the structural components and the insulating components is amplified by the temperature extremes to which the nozzles are subjected, and may further contribute to debonding of the adhesive. Debonding and degradation of the adhesives may expose the metal structural components to the flow of hot gas exiting the rocket motor, which may quickly lead to failure of the nozzle. As a result, conventional thrust-vectorable rocket motor nozzles may fail after only one or two consecutive pulses during continuous exposure to a space environment.

BRIEF SUMMARY

In some embodiments, the present disclosure includes a thrust-vectoring rocket motor nozzle including a forward assembly having a forward shell with a flange configured for connection to a motor, a throat portion opposite the flange, and a ball joint sleeve proximate the throat portion. An exit cone assembly may include a ball joint socket configured to mate with the ball joint sleeve and allow movement of the exit cone about one or more axes relative to the forward assembly. A thermal barrier may be disposed in a gap between the forward assembly and the exit cone assembly.

In other embodiments, the present disclosure includes a thrust-vectoring rocket motor nozzle including a forward shell having a flange for connection to a solid rocket motor and a throat portion opposite the flange and a throat insulator disposed within the forward shell. The throat insulator is retained within the forward shell by mechanical interference between geometric features in the throat portion of the forward shell and complementary geometric features in the throat insulator.

In yet other embodiments, a method of forming at least a portion of a thrust-vectorable rocket motor nozzle includes forming an insulator comprising fiber materials in a resin matrix by layering the fiber materials on a mandrel, removing the insulator from the mandrel, inserting the insulator within a structural component of the rocket motor nozzle, expanding the insulator against an interior surface of the structural component, and curing the resin matrix to mechanically lock the insulator within the structural component.

In yet other embodiments, a rocket motor includes a rocket motor casing containing a propellant substance and a thrust-vectoring nozzle. The thrust-vectoring nozzle includes a forward assembly comprising a forward shell with a flange connected to an aft end of the rocket motor casing, a throat portion opposite the flange, and a ball joint sleeve proximate the throat portion. An exit cone assembly includes a ball joint socket configured to mate with the ball joint sleeve and allow movement of the exit cone about one or more axes relative to the forward assembly. A thermal barrier is disposed in a gap between the forward assembly and the exit cone assembly.

DETAILED DESCRIPTION

Figure 1:
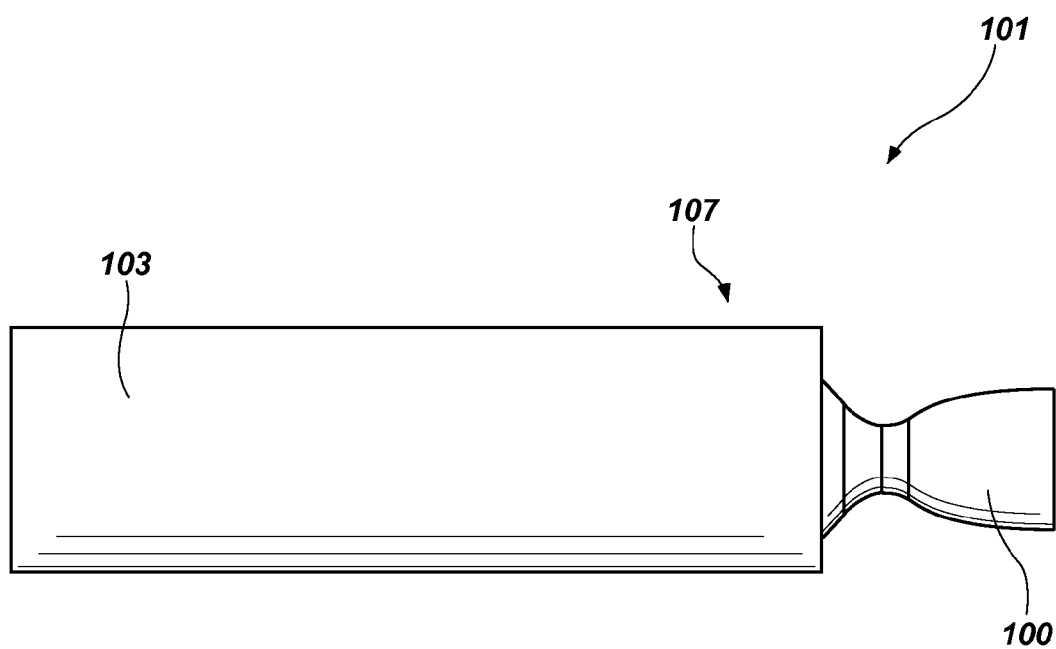
FIG. 1 is a plan view of a rocket motor with a rocket motor nozzle according to an embodiment of the disclosure.

FIG. 1 shows a rocket motor assembly 101 including a motor portion 103 and a rocket motor nozzle 100 according to an embodiment of the disclosure. The motor portion 103 may comprise a solid fuel rocket motor, a liquid fuel rocket motor, a hybrid fuel rocket motor, or combinations thereof. The rocket motor nozzle 100 may be attached to the motor portion 103 at an aft end 107 of the motor portion 103. The rocket motor assembly 101 may be used, for example, in manned or unmanned launch vehicles for crew transport, payload transport, space exploration, or other purposes.

Figure 2:
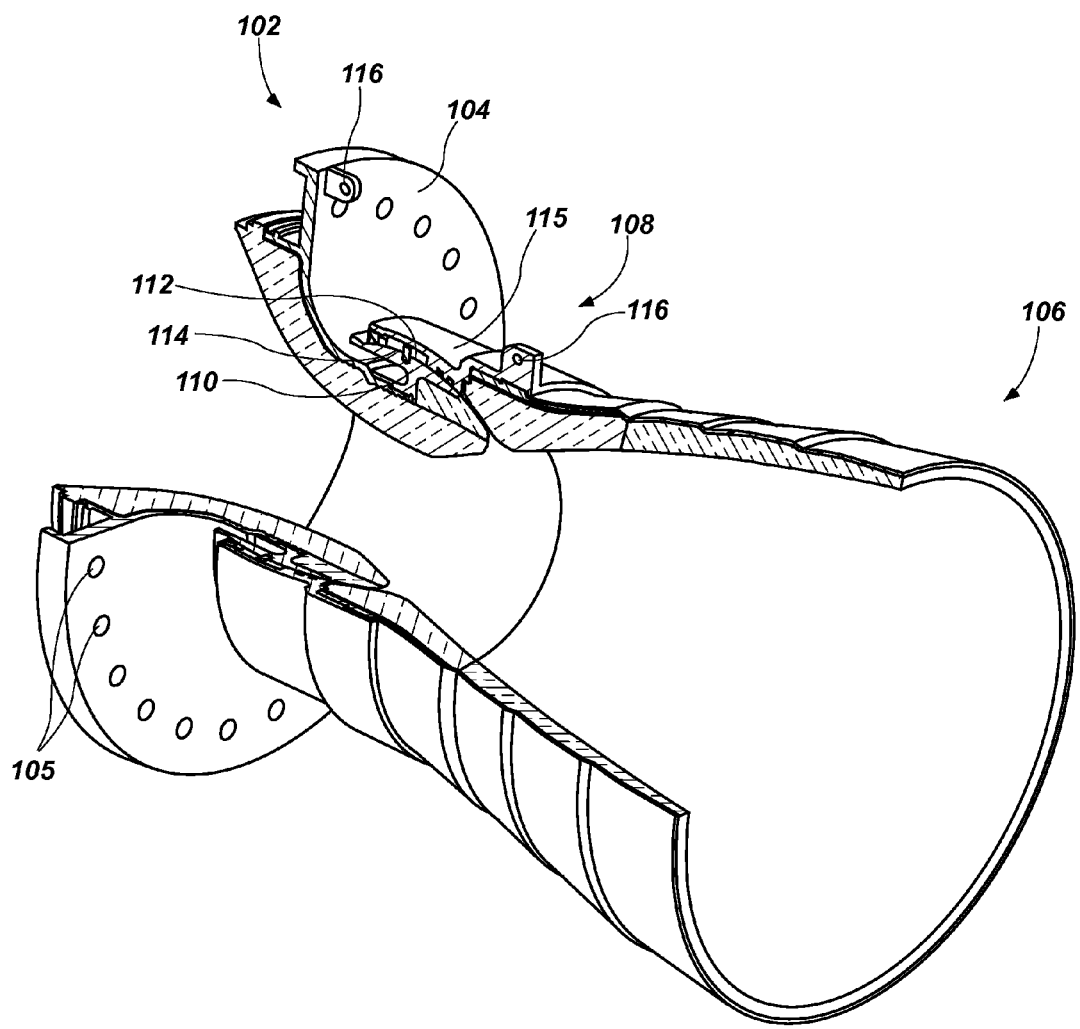
FIG. 2 is a perspective, partial cross-sectional view of a rocket motor nozzle according to an embodiment of the disclosure.

FIG. 2 shows a rocket motor nozzle 100 according to an embodiment of the present disclosure. The nozzle 100 includes a forward assembly 102 with an aft closure flange 104 for connection to a motor portion 103 (FIG. 1). For example, the aft closure flange 104 may include a plurality of mounting holes 105 through which bolts or threaded studs may pass to secure the forward assembly 102 to the motor portion 103. The nozzle 100 also includes an exit cone assembly 106 movably connected to the forward assembly 102 by a ball joint 108. The ball joint 108 may include a ball joint sleeve 110 with an outer surface 112 having a shape defined by at least a portion of a sphere. The outer surface 112 may interface with a complementary inner surface 114 of a ball joint socket 115 of the exit cone assembly 106 to allow the exit cone assembly 106 to move relative to the forward assembly 102. For example, the exit cone assembly 106 may pivot relative to the forward assembly 102 about one or more axes to provide the nozzle 100 with thrust-vectoring capability. The position of the exit cone assembly 106 relative to the aft closure flange 104 may be controlled by actuators (not shown), e.g., electromechanical or hydraulic linear actuators connected between actuator mounting lugs 116 and controlled by an avionics system. The rocket motor nozzle 100 may include features configured to facilitate retention of insulating components within structural components under extreme thermal cycling conditions. For example, the insulating components may be cured in place with structural components, the insulating components may be substantially circumferentially continuous, and the structural components may include geometric and other features configured to mechanically retain the insulating components within the structural components. The nozzle 100 may also include a thermal barrier configured to protect the ball joint surfaces 112 and 114, as will be described below.

Figure 3:
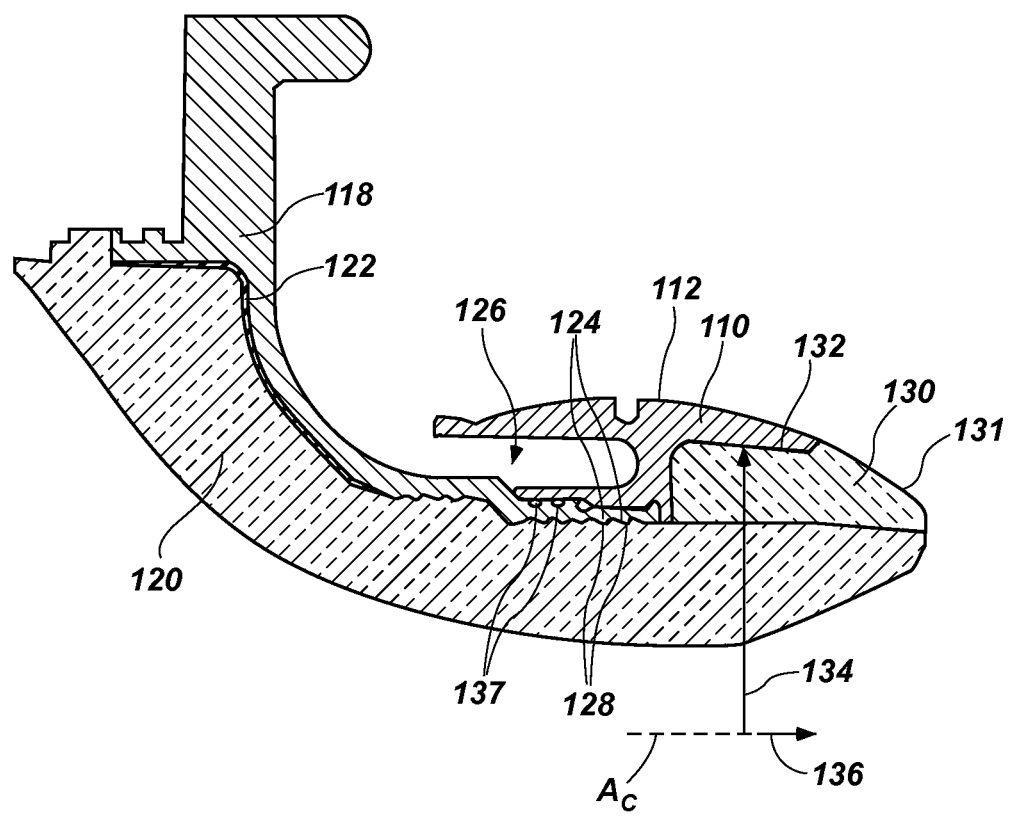
FIG. 3 is a cross-sectional view of an embodiment of a forward assembly of the rocket motor nozzle of FIG. 2.

Referring now to FIG. 3, the forward assembly 102 may include a forward shell 118 and a throat insulator 120 disposed within the forward shell 118. The forward shell 118 may comprise a material such as a metal alloy. One non-limiting example of a suitable metal alloy is 6Al-4V titanium. The forward shell 118 may be cast, forged, and/or machined to achieve desired material properties and dimensions. The forward shell 118, and other components similarly comprising metal alloys, may be characterized as structural components of the rocket motor nozzle 100 (FIG. 1).

The throat insulator 120 may comprise a material that has a low thermal conductivity and high heat resistance to protect the forward shell 118 from the high temperature gas flow present in the interior of the rocket nozzle 100 during operation. For example, a suitable insulating material could include a composite material including one or more plies of woven or matted silica or carbon fibers in a phenolic resin matrix. The throat insulator 120 may be formed as a single, circumferentially continuous component. In other words, the throat insulator 120 may not include any seams (e.g., bondlines) extending in a radial direction with respect to a central longitudinal axis $A_c$ of the rocket motor nozzle 100 (FIG. 2).

The materials of the forward shell 118 and throat insulator 120 may have differing rates of thermal expansion. Thus, the extreme temperature cycles to which the rocket motor nozzle 100 is subjected may cause changes in relative size between the forward shell 118 and the throat insulator 120. Accordingly, a flexible shear ply 122 may be disposed between at least a portion of the forward shell 118 and the throat insulator 120. The shear ply 122 may be configured to deform under shear stress in the shear ply 122 caused by differences in thermal expansion and contraction rates of the forward shell 118 and the throat insulator 120. The shear ply 122 may comprise a material that is resistant to temperature extremes and maintains flexibility under extremely cold conditions. As a non-limiting example, the shear ply 122 may comprise a room-temperature vulcanization (RTV) silicone rubber material. The flexible shear ply 122 may enable the forward assembly 102 to endure thermal shock from repeated uses and extended periods of non-use of the rocket motor without failure. In some embodiments, the throat insulator 120 may be in direct contact with the shear ply 122, as discussed in further detail below.

The throat insulator 120 may be mechanically locked within the forward shell 118 by mechanical interaction between geometric features of the forward shell 118 and complementary geometric features of the throat insulator 120. For example, the forward shell 118 may include one or more protrusions 124 formed within a throat portion 126 of the forward shell 118. The throat insulator 120 may include one or more complementary grooves 128 that interlock with one or more protrusions 124 on the forward shell 118 to retain the throat insulator 120 within the forward shell 118. In some embodiments, the throat insulator 120 may be in direct contact with the throat portion 126 of the forward shell 118, i.e., there may not be any adhesive materials between the throat insulator 120 and the throat portion 126 of the forward shell 118.

The one or more protrusions 124 may extend circumferentially around the interior of the throat portion 126. In some embodiments, the one or more protrusions 124 may extend in a helical pattern around the interior of the throat portion 126. The one or more protrusions 124 may be formed continuously or discontinuously around the interior of the throat portion 126.

Figure 4:
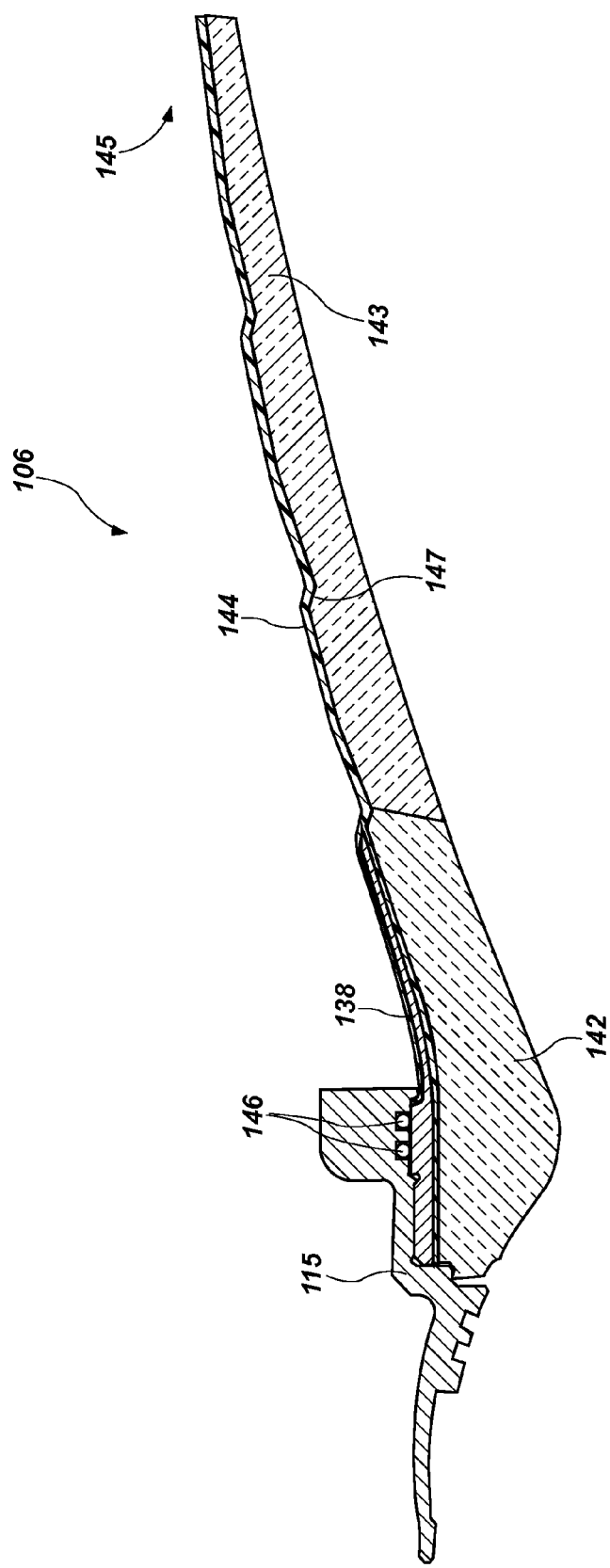
FIG. 4 is a cross-sectional view of an embodiment of an exit cone assembly of the rocket motor nozzle of FIG. 2.

The ball joint sleeve 110 may comprise structural materials as described in connection with the forward shell 118. For example, the ball joint sleeve 110 may comprise a metal alloy, such as 6Al-4V titanium. The outer surface 112 of the ball joint sleeve 110 may be protected from degradation by a heat-resistant coating. As a non-limiting example, the outer surface 112 of the ball joint sleeve 110 may be coated with tungsten disulfide ($WS_2$). The outer surface 112 may have a surface finish that provides low friction between the outer surface 112 and the inner surface 114 of a ball joint socket 115 (FIG. 4). For example, the outer surface 112 may be polished to a low surface roughness (e.g., lower than an as-cast or as-machined surface roughness) prior to application of the $WS_2$ or other coating.

The forward assembly 102 may include a ball joint nose insulator 130. The ball joint nose insulator 130 may be at least partially disposed within an annular recess 132 in the ball joint sleeve 110. The annular recess 132 may have an inside radius 134 that decreases in direction 136 when viewed in the cross-section of FIG. 3. When the ball joint sleeve 110, the ball joint nose insulator 130, the throat insulator 120, and the forward shell 118 are assembled together as shown in FIG. 3, the ball joint nose insulator 130 may be trapped within the annular recess 132 of the ball joint sleeve 110 by a reverse wedge profile created by the decreasing inside radius 134 of the annular recess 132. Thus, the assembled configuration of the ball joint nose insulator 130, the throat insulator 120, and the ball joint sleeve 110 may serve to retain the ball joint nose insulator 130 within the annular recess 132 of the ball joint sleeve 110 without the use of adhesive materials.

To assemble the forward assembly 102, the forward shell 118 may be cast, forged, and/or machined to the desired shape. The shear ply 122 may be formed by applying uncured RTV silicone material to the forward shell 118, curing the RTV silicone, and machining or otherwise shaping the shear ply 122 to the desired dimensions. The throat insulator 120 may be formed by layering together plies of a woven or non-woven fibrous silica or carbon material. For example, a woven silica or carbon cloth tape may be wrapped over a rotating mandrel (not shown) until the layers of tape have generally assumed the desired shape of the throat insulator 120. The throat insulator 120 may be formed of a substantially continuous length of material wrapped several times around the mandrel, or may include multiple discrete plies of material. In some embodiments, the cloth tape may be pre-impregnated with an uncured phenolic resin matrix material. In other embodiments, the uncured phenolic resin matrix material may be applied to the cloth tape during or after the cloth tape is wrapped to the general desired shape. In some embodiments, the uncured throat insulator 120 may undergo a partial cure before removal from the mandrel. The uncured or partially cured throat insulator 120 may be removed from the mandrel and inserted into the forward shell 118. The uncured or partially cured throat insulator 120 may be expanded from the inside (i.e., swaged) such that the uncured or partially cured throat insulator 120 deforms to interlock with the protrusions 124 of the forward shell 118. For example, a tapered mandrel or an expanding mandrel may be inserted within the uncured or partially cured throat insulator 120 to expand the throat insulator 120 against the forward shell 118. The forward shell 118 and the uncured or partially cured throat insulator 120 may be placed as an assembly within, e.g., an autoclave or other device to fully cure the throat insulator 120 in place within the forward shell 118. Following curing of the throat insulator 120, the throat insulator 120 may be machined to the final desired shape.

The throat insulator 120 may be mechanically locked in place by interaction between the cured throat insulator 120 and the protrusions 124 of the forward shell 118. Furthermore, the finished throat insulator 120 may be a substantially circumferentially continuous component with no radial seams. The absence of bonding adhesive from the interface between the throat insulator 120 and the throat portion 126 of the forward shell 118 and the presence of the flexible shear ply 122 between the throat insulator 120 and the forward shell 118 near the aft closure flange 104 may provide improved retention of insulation within the forward shell 118 compared to conventional designs.

The ball joint nose insulator 130 may similarly be formed by layering plies of carbon or silica material by, e.g., wrapping a cloth tape around a rotating mandrel (not shown) as described above in connection with the throat insulator 120. The uncured ball joint nose insulator 130 may be removed from the mandrel and fitted within the annular recess 132 of the ball joint sleeve 110. In some embodiments, the ball joint nose insulator 130 may be partially cured on the mandrel prior to removal from the mandrel and fitting within the annular recess 132. Similar to the method described above in connection with the throat insulator 120, the ball joint nose insulator 130 may be expanded against the inside of the annular recess 132 by a tapered mandrel or an expanding mandrel (not shown). The ball joint sleeve 110 and the uncured or partially cured ball joint nose insulator 130 may then be placed together in an autoclave or another device to fully cure the ball joint nose insulator 130. After curing, the ball joint nose insulator 130 may be machined to final desired dimensions. The ball joint nose insulator 130 may include a ball joint surface 131 with a cross-sectional profile that forms a substantially continuous partially spherical profile with the outer surface 112 of the ball joint sleeve 110.

The ball joint sleeve 110 and ball joint nose insulator 130 may be fitted over the throat portion 126 of the forward assembly 102, as shown in FIG. 3. In some embodiments, one or both of the ball joint sleeve 110 and the ball joint nose insulator 130 may be bonded to one or both of the forward shell 118 and the throat insulation 120 with an adhesive, e.g., an epoxy adhesive. One or more seals such as O-rings 137 may be disposed between the ball joint sleeve 110 and the forward shell 118. The ball joint nose insulator 130 and throat insulation 120 may undergo a final machining step to ensure that the ball joint nose insulator 130 and the throat insulator 120 together have a continuous profile with the desired dimensions.

Referring now to FIG. 4, the exit cone assembly 106 may include an exit cone shell 138 comprising structural materials such as those described above in connection with the forward shell 118 and the ball joint sleeve 110 (e.g., a titanium alloy). The exit cone shell 138 may fit within the ball joint socket 115. The exit cone assembly 106 may include an exit cone insulator 142 made from, for example, the same materials used for the throat insulator 120 (FIG. 3). The exit cone assembly 106 may include an exit cone overwrap 144 covering an outer surface of the exit cone insulator 142. The exit cone overwrap 144 may comprise, for example, composite materials such as carbon fibers woven or matted together in a matrix material of phenolic resin or heat-resistant polyimide. The exit cone overwrap 144 may provide structural support to the exit cone insulator 142 and protect the exit cone insulation 142 from debris impact during orbit or re-entry.

The exit cone assembly 106 may be formed in a manner similar to that described above in connection with the forward assembly 102. For example, material comprising silica or carbon fibers may be wrapped around a rotating mandrel (not shown) to form an uncured exit cone insulator 142 generally having the desired shape. Optionally, the uncured exit cone insulator 142 may be partially cured before removal from the mandrel.

The exit cone insulator 142 may comprise a single, unitary insulator, or may include multiple insulator portions. For example, the exit cone insulator 142 may comprise multiple insulator portions made from materials having different weights. In the embodiment of FIG. 4, a lighter-weight insulator material portion 143 may be used proximate a nozzle exit 145 of the exit cone assembly 106, where gas pressures and temperatures may be relatively lower as the gas expands before leaving the nozzle 100 (FIG. 1).

One or more plies of material used to form the exit cone overwrap 144, e.g., a carbon fiber-reinforced polyimide or phenolic material, may be layered over the uncured or partially cured exit cone insulator 142 before the exit cone insulator 142 is inserted in the exit cone shell 138. The cured exit cone insulator 142 with one or more cured layers of reinforced polyimide material surrounding the exterior may be machined to size and fitted within the exit cone shell 138. An additional one or more plies of the exit cone overwrap 144 material may be wrapped around at least a portion of the exit cone shell 138 and the previously cured or partially cured one or more plies of overwrap material surrounding the exit cone insulator 142. The exit cone shell 138, the exit cone insulator 142, and the exit cone overwrap 144 may again be placed within an autoclave and cured. In other words, at least a portion of the exit cone shell 138 may be "sandwiched" between layers of the exit cone overwrap 144. In other embodiments, the exit cone shell 138 may be bonded to the cured exit cone insulator 142 and exit cone overwrap 144 with an adhesive, e.g., an epoxy adhesive.

The cured exit cone insulator 142 and exit cone overwrap 144 and the attached exit cone shell 138 may then be inserted into the ball joint socket 115 of the ball joint 108 to form the complete exit cone assembly 106. In some embodiments, seals such as O-rings 146 may be disposed between the exit cone shell 138 and the ball joint socket 115. The exit cone shell 138 may be retained within the ball joint socket 115 by mechanical fasteners such as set screws, adhesives, welding, or other suitable methods.

The exit cone insulator 142 may include features configured to interlock with features on one or both of the exit cone shell 138 and the exit cone overwrap 144 to mechanically retain the exit cone insulator 142 within the exit cone overwrap 144. For example, in some embodiments, the exit cone insulator 142 may include one or more circumferential steps 147. The exit cone overwrap 144 may substantially conform to the circumferential steps 147 as the overwrap material is applied to the exit cone insulator 142 prior to curing. When the exit cone overwrap 144 is cured in place over the exit cone insulator 142, mechanical interaction between the circumferential steps 147 of the exit cone insulator 142 and the complementary shape of the cured exit cone overwrap 144 may serve to retain the exit cone insulator 142 within the exit cone overwrap 144.

Figure 5:
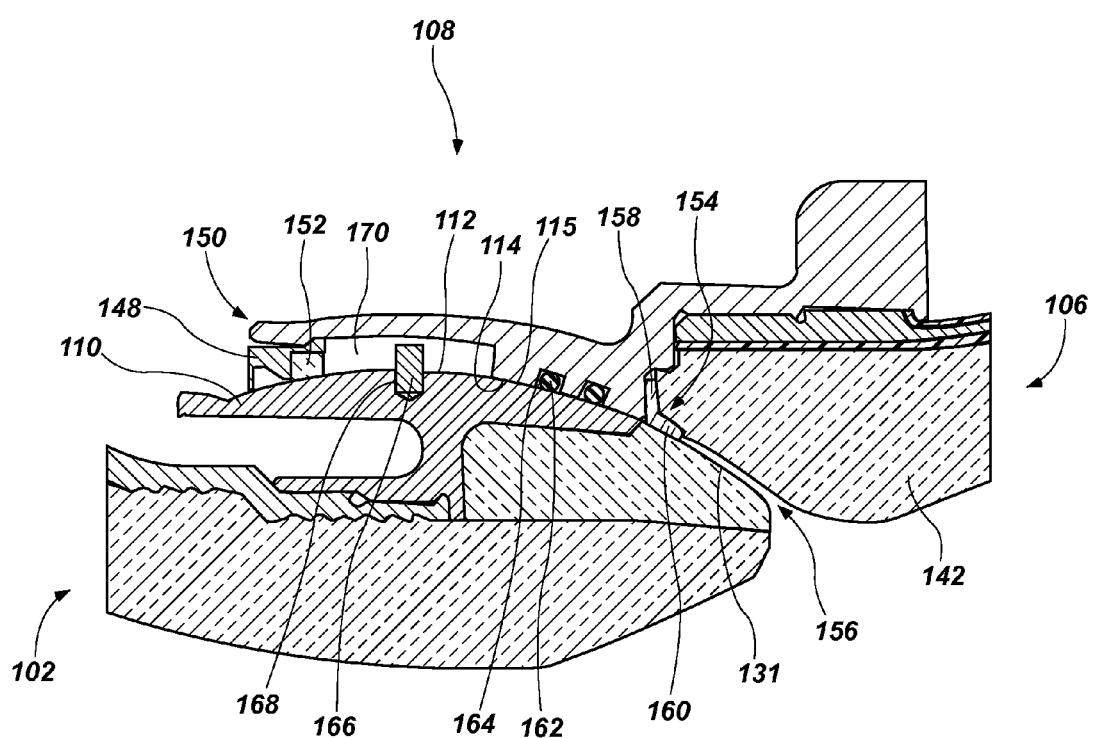
FIG. 5 is a cross-sectional view of an embodiment of a ball joint of the rocket motor nozzle of FIG. 2.

Referring now to FIG. 5, the exit cone assembly 106 may be retained on the ball joint sleeve 110 by a threaded retaining ring 148 that fits within a threaded end 150 of the ball joint socket 115. The retaining ring 148 may comprise a material such as a metal alloy, e.g., a titanium alloy. A substantially annular bearing insert 152 may be disposed within the retaining ring 148 and configured so that the bearing insert 152 contacts the outer surface 112 of the ball joint sleeve 110 when the ball joint socket 115 is placed over the ball joint sleeve 110 and the retaining ring 148 is threaded into the ball joint socket 115. The bearing insert 152 may comprise a material resistant to extreme temperatures and capable of providing a relatively soft, low-friction contact surface. As a non-limiting example, the bearing insert 152 may comprise a polymer such as polyimide. One example of a suitable polyimide material is VESPEL®, available from E. I. du Pont de Nemours and Co., Wilmington, Del., U.S.

The ball joint 108 may include a thermal barrier 154 configured to seal a gap 156 (may be referred to in the art as a "splitline") between the ball joint surface 131 of the ball joint nose insulator 130 and the exit cone insulator 142. The thermal barrier 154 may comprise the same material as the throat insulator 120 and the exit cone insulator 142. The thermal barrier 154 may have a shallow, generally "V" or "L" shape in the cross-sectional view shown in FIG. 5, with a first leg 158 disposed between the ball joint socket 115 and the exit cone insulator 142. A second leg 160 of the thermal barrier 154 may be disposed between the exit cone insulator 142 and the ball joint surface 131 of the ball joint nose insulator 130. The thermal barrier 154 may prevent pressurized, hot gas flowing through the rocket nozzle 100 from penetrating the gap 156 between the ball joint nose insulator 130 and the exit cone insulator 142, thus protecting the bearing surfaces (i.e., ball joint outer surface 112 and ball joint inner surface 114) of the ball joint 108 and the ball joint socket 115 from degradation and eventual failure. The gap 156 may be proximate a location within the rocket motor nozzle 100 where gas flow velocity reaches supersonic levels.

One or more seals 162 may be disposed in grooves 164 in the ball joint inner surface 114 of the ball joint socket 115. In some embodiments, the seals 162 may include a PTFE jacket energized by a spring to maintain contact with the ball joint sleeve outer surface 112 and prevent flow of hot gasses between the ball joint sleeve outer surface 112 and the inner surface 114 of the ball joint socket 115.

In other embodiments, the seals 162 may be O-ring seals or packing materials such as graphite, fiberglass, or other high-temperature textile yarn or braid. In such embodiments, a thrust force acting on the exit cone assembly 106 may compress the seals 162, tightening the gap 156 and further preventing hot gas, particulates, and slag from penetrating between the ball joint sleeve 110 and the ball joint socket 115.

The ball joint 108 may include an anti-rotation pin 166 configured to prevent relative rotation between the ball joint sleeve 110 and the ball joint socket 115 about the central longitudinal axis $A_c$ of the nozzle 100 (FIG. 1), while allowing rotation about one or more axes normal to the longitudinal axis $A_c$. The anti-rotation pin 166 may be inserted in a receptacle 168 of the ball joint sleeve 110 and may ride within a groove 170 oriented generally along the central axis $A_c$ (FIG. 1) in the ball joint socket 115.

To assemble the rocket motor nozzle 100 (FIG. 1), the retaining ring 148 (FIG. 5) and the associated bearing insert 152 are placed over the throat portion 126 of the forward assembly 102 prior to the installation of the ball joint sleeve 110 and ball joint nose insulation 130 over the throat portion 126 of the forward shell 118. The exit cone assembly 106 may be fitted to the forward assembly 102 by sliding the ball joint socket 115 over the ball joint sleeve 110, threading the retaining ring 148 into the threaded end 150 of the ball joint socket 115, and tightening the retaining ring 148. The threaded retaining ring 148 may enable removal and repair or replacement of the exit cone assembly 106 if the exit cone assembly 106 becomes worn or damaged.

The thrust-vectorable rocket motor nozzle 100 (FIG. 1) according to the present disclosure may exhibit improved insulation retention and improved multipulse capability compared to conventional designs. For example, while conventional thrust-vectorable rocket motor nozzles may fail after only one or two pulses due to insulation debonding or other failure mechanisms, the rocket motor nozzle 100 according to the disclosure may withstand five or more discrete, consecutive pulses of a rocket motor to which the rocket motor nozzle is attached without failure, even during continuous exposure to a space environment between pulses.

While particular embodiments of the disclosure have been shown and described, numerous variations, modifications and alternative embodiments encompassed by the present disclosure will occur to those skilled in the art. Accordingly, the invention is only limited in scope by the appended claims and their legal equivalents.

What is claimed is:

1. A thrust-vectoring rocket motor nozzle, comprising:
   a forward assembly comprising a forward shell with a flange configured for connection to a motor, a throat portion opposite the flange, a throat insulator connected to the forward shell with at least one groove complementary to at least one protrusion protruding from the forward shell, and a ball joint sleeve proximate the throat portion;
   an exit cone assembly with a ball joint socket configured to mate with the ball joint sleeve and allow movement of the exit cone assembly about one or more axes relative to the forward assembly;
   a removable retaining ring disposed within the ball joint socket of the exit cone assembly and configured to removably retain the ball joint socket of the exit cone assembly on the forward assembly; and
   a thermal barrier disposed in a gap between the forward assembly and the exit cone assembly.

2. The rocket motor nozzle of claim 1, wherein the gap is located in a supersonic flow portion of the rocket motor nozzle.

3. The rocket motor nozzle of claim 1, wherein the forward assembly comprises a circumferentially continuous throat insulator disposed within the forward shell.

4. The rocket motor nozzle of claim 3, wherein the throat portion of the forward shell comprises one or more protrusions extending inward from an interior surface of the throat portion, and wherein the throat insulator comprises one or more grooves interlocked respectively with the one or more protrusions extending inward from the interior surface of the throat portion of the forward shell.

5. The rocket motor nozzle of claim 1, wherein the exit cone assembly comprises an exit cone overwrap comprising multiple plies of an exit cone overwrap material surrounding an exit cone insulator and an exit cone shell at least partially disposed between plies of the exit cone overwrap material.

6. The rocket motor nozzle of claim 5, wherein the exit cone insulator is circumferentially continuous.

7. The rocket motor nozzle of claim 5, wherein the thermal barrier comprises a first portion disposed between the ball joint socket and the exit cone insulator and a second portion disposed between the ball joint sleeve and the exit cone insulator.

8. A thrust-vectoring rocket motor nozzle, comprising:
a forward shell having a flange for connection to a solid rocket motor and a throat portion opposite the flange;
a throat insulator disposed within the forward shell, wherein the throat insulator is retained within the forward shell by mechanical interference between at least one protrusion from the throat portion of the forward shell and at least one complementary groove in the throat insulator;
a ball joint sleeve with a ball joint outer surface proximate the throat portion of the forward shell;
an exit cone assembly, comprising:
a ball joint interior surface configured to mate with the ball joint outer surface and allow movement of the exit cone assembly about one or more axes relative to the forward shell; and
a removable retaining ring disposed within a ball joint socket of the exit cone assembly to removably retain the ball joint socket of the exit cone assembly on the forward shell.

9. The rocket motor nozzle of claim 8, further comprising an exit cone overwrap, wherein the exit cone assembly further comprises an exit cone insulator at least partially disposed within an exit cone shell and the exit cone insulator being retained within the exit cone shell by mechanical interference between the exit cone overwrap, the exit cone shell, and the exit cone insulator.

10. The rocket motor nozzle of claim 9, further comprising a ball joint nose insulator having a ball joint surface that forms a substantially continuous partially spherical surface with the ball joint outer surface.

11. The rocket motor nozzle of claim 10, wherein the ball joint nose insulator is mechanically locked within an annular recess of the ball joint sleeve.

12. The rocket motor nozzle of claim 8, further comprising a flexible shear ply disposed between a portion of the forward shell and the throat insulator.

13. The rocket motor nozzle of claim 12, wherein the shear ply comprises a room-temperature vulcanization silicone rubber material.

14. The rocket motor nozzle of claim 8, wherein the rocket motor nozzle is configured to withstand at least about five (5) discrete operational pulses of the solid rocket motor to which the nozzle is attached while the rocket motor nozzle is continuously subjected to a space environment.

15. A rocket motor assembly, comprising:
a rocket motor casing containing a propellant substance; and
a thrust-vectoring nozzle, the thrust-vectoring nozzle comprising:
a forward assembly comprising a forward shell with a flange connected to an aft end of the rocket motor casing, a throat portion opposite the flange, a throat insulator retained with at least one groove complementary to at least one protrusion protruding from the forward shell, and a ball joint sleeve proximate the throat portion;
an exit cone assembly with a ball joint socket configured to mate with the ball joint sleeve and allow movement of the exit cone assembly about one or more axes relative to the forward assembly;
a removable retaining ring disposed within the ball joint socket of the exit cone assembly to removably retain the ball joint socket of the exit cone assembly to the forward assembly; and
a thermal barrier disposed in a gap between the forward assembly and the exit cone assembly.

\* \* \* \* \*

UNITED STATES PATENT AND TRADEMARK OFFICE
CERTIFICATE OF CORRECTION

PATENT NO. : 10,001,085 B2
APPLICATION NO. : 14/495063
DATED : June 19, 2018
INVENTOR(S) : Clinton R. Isaac et al.

Page 1 of 1

It is certified that error appears in the above-identified patent and that said Letters Patent is hereby corrected as shown below:

In the Specification

Column 1, Line 10, change "NNK12MSO3S, Subcontract" to --NNK12MS03S, Subcontract--

Signed and Sealed this
Eleventh Day of September, 2018

Andrei Iancu
*Director of the United States Patent and Trademark Office*